(12) United States Patent
Presswood, Jr. et al.

(10) Patent No.: US 8,628,741 B2
(45) Date of Patent: Jan. 14, 2014

(54) OFF GAS TREATMENT USING A METAL REACTANT ALLOY COMPOSITION

(76) Inventors: Ronald G. Presswood, Jr., Houston, TX (US); Ian C. Bishop, Houston, TX (US)

(*) Notice: Subject to any disclaimer, the term of this patent is extended or adjusted under 35 U.S.C. 154(b) by 0 days.

(21) Appl. No.: 13/641,515

(22) PCT Filed: Apr. 26, 2011

(86) PCT No.: PCT/US2011/033931
§ 371 (c)(1),
(2), (4) Date: Oct. 16, 2012

(87) PCT Pub. No.: WO2011/137113
PCT Pub. Date: Nov. 3, 2011

(65) Prior Publication Data
US 2013/0034480 A1 Feb. 7, 2013

Related U.S. Application Data

(60) Provisional application No. 61/328,970, filed on Apr. 28, 2010.

(51) Int. Cl.
*B01D 53/34* (2006.01)
*B01D 53/62* (2006.01)
*B01D 53/78* (2006.01)

(52) U.S. Cl.
USPC ........ 423/210; 423/220; 423/235; 423/242.1; 423/246

(58) Field of Classification Search
USPC ........ 423/210, 220, 235, 242.1, 246; 422/168
See application file for complete search history.

(56) References Cited

U.S. PATENT DOCUMENTS

| | | | | |
|---|---|---|---|---|
| 3,718,733 A | * | 2/1973 | Gehri | 423/213.2 |
| 4,473,537 A | * | 9/1984 | Ford et al. | 423/239.1 |
| 5,396,850 A | * | 3/1995 | Conochie et al. | 110/346 |
| 5,443,572 A | * | 8/1995 | Wilkinson et al. | 266/46 |
| 5,776,420 A | * | 7/1998 | Nagel | 422/184.1 |
| 8,540,954 B2 | * | 9/2013 | Olsen | 423/220 |
| 2003/0109768 A1 | * | 6/2003 | Wagner | 588/201 |
| 2005/0169824 A1 | * | 8/2005 | Downs et al. | 423/210 |

FOREIGN PATENT DOCUMENTS

| | | | | |
|---|---|---|---|---|
| JP | 60-213353 A | * | 10/1985 | B22D 43/00 |
| JP | 11 309335 A | | 11/1999 | |
| JP | 11-309335 A | * | 11/1999 | B01D 53/46 |
| WO | WO 2008/074659 A2 | | 6/2008 | |

OTHER PUBLICATIONS

Notification of Transmittal of the International Preliminary Report on Patentability for PCT/US2011/033931 filed Apr. 26, 2011 (having a priority date of Apr. 28, 2010) along with Written Opinion.

* cited by examiner

*Primary Examiner* — Timothy Vanoy
(74) *Attorney, Agent, or Firm* — Morgan, Lewis & Bockius LLP

(57) ABSTRACT

This invention relates to a method and apparatus for treating a flue gas stream containing oxygen containing greenhouse gases. In particular, the method comprises reacting a flue gas steam with a molten aluminum or aluminum alloy bath, creating alumina and elemental carbon, elemental sulfur, and molecular nitrogen. The apparatus includes a reaction vessel for carrying out the reaction, as well as other equipment necessary for capturing and removing the reaction products. Further, the process can be used to cogenerate electricity using the excess heat generated by the process.

3 Claims, 3 Drawing Sheets

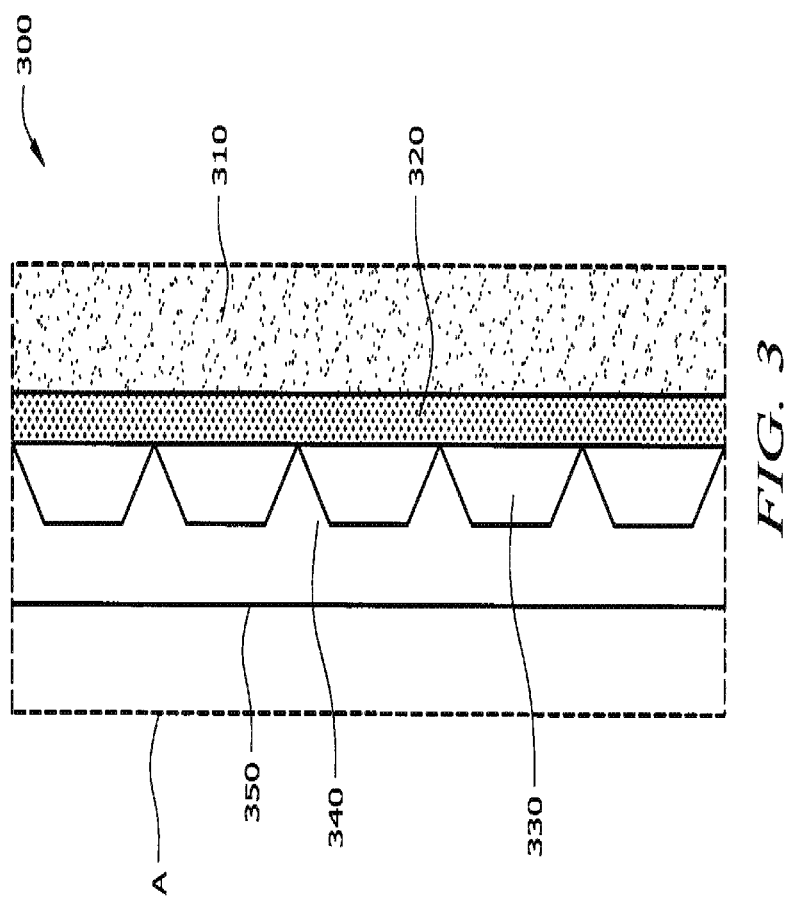

OFF GAS TREATMENT USING A METAL REACTANT ALLOY COMPOSITION

RELATED APPLICATIONS

This application claims priority to U.S. provisional Patent Application No. 61/328,970 filed on Apr. 28, 2010, which is incorporated herein by reference.

FIELD OF THE INVENTION

The present invention relates to a method to capture and decompose greenhouse gases in a molten aluminum or alloy bath composed of aluminum, zinc, iron, copper, silicon and calcium alloys. This method is splits the oxygen-containing gaseous compounds found in the flue gas of combustion processes, such as the combustion of coal, thus reducing or preventing greenhouse gas emissions. At the same time, this process is capable of reacting with organic and metallic compounds in the same gaseous steam. The gases with which the molten metal reacts include, but are not limited to, carbon monoxide, carbon dioxide, nitrogen dioxide, sulfur dioxide, sulfur trioxide.

BACKGROUND OF THE INVENTION

Although a number of methods exist to remove greenhouse gases from flue gas streams and the like, these methods are costly and in some cases create a secondary waste that can be more problematic than the greenhouse gas stream itself. Currently, a number of scrubbing technologies are used to reduce or remove greenhouse gases. This includes scrubbers such as quick lime scrubbers, which are reactive processes that remove the oxygen-containing greenhouse gases from the flue gas stream. Steam scrubbers are also used to remove compounds such as sulfur dioxide. High heat processes, such as rotary kilns, flares, or incinerators are also used to incinerate greenhouse gases in flue gas streams. Recently, carbon capture and storage technologies have been employed. These methods capture the carbon compounds, such as carbon dioxide, which are either stored or used for other purposes. While these processes work, they require significant energy input or create waste streams that must be disposed of at a cost to the operator and with potential future environmental impact.

Thus there is a need in the art for an improved method to economically remove oxygen-containing greenhouse gases from flue gas streams while creating usable secondary products.

SUMMARY OF THE INVENTION

The present invention provides a method and an apparatus for the breakdown of oxygen-containing greenhouse gases, which include, but are not limited to, carbon monoxide, carbon dioxide, nitrogen dioxide, sulfur dioxide, and sulfur trioxide. The process utilizes a molten aluminum or molten aluminum alloy bath, which reacts with the oxygen containing greenhouse gases. The aluminum can be alloyed with other metals including, but not limited to zinc, iron, copper, silicon, and calcium. Other metals and metal alloys, such as, silicon and calcium can also be used. Generally, the flue gas stream from a combustion process, such as the combustion of coal, is passed through the aluminum or aluminum alloy bath, which reacts with the oxygen-containing gases. In this process the aluminum or other alloys combines with the oxygen from the oxygen containing greenhouse gases creating alumina ($Al_2O_3$) and depending on the oxygen containing greenhouse gas elemental carbon, and elemental sulfur, and molecular nitrogen. These products can be removed from the molten bath. The alumina, carbon, and sulfur can be used as feed products for other processes and the nitrogen can be vented; however, it is preferred that it is captured for use in other processes.

The aluminum or aluminum alloy bath is able to remove oxygen compounds by chemically reacting with them. In particular, the aluminum bath is used to remove carbon dioxide from the gas stream by reacting with the carbon dioxide to make alumina. This reaction is represented by the formula:

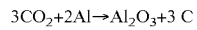

$$3CO_2 + 2Al \rightarrow Al_2O_3 + 3\ C$$

Similarly, the aluminum bath can also be used to remove sulfur dioxide from the gas stream by reacting with the sulfur dioxide to make alumina and elemental sulfur.

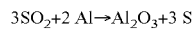

$$3SO_2 + 2\ Al \rightarrow Al_2O_3 + 3\ S$$

Similar equations can be developed for other oxygen containing greenhouse gases contained in the flue gas.

One advantage of this process is the reaction of splitting the oxygen-containing greenhouse gases into its elemental components with molten aluminum to form alumina and elemental carbon is typically exothermic. Thus, the excess heat generated from the process can be used to facilitate other processes such as cogeneration of power.

This process has been proven in laboratory tests, using flue gases generated from burning coal. The flue gases from the combusted coal were passed through molten aluminum. The flue gases were completely consumed by the molten aluminum, thus, there was no off-gas from the aluminum-flue gas reaction. This is indicated by the mass of the molten aluminum, which increased by an amount equal to the mass the coal that was combusted plus the amount of oxygen that reacted with the coal during combustion (See Table 1).

TABLE 1

Process Mass Analysis

|  | Initial Mass Grams | Final Mass Grams |
|---|---|---|
| Coal | 1.4 | 0.2 |
| Aluminum | 11.3 | 15.6 |
| Oxygen | 3.1 | |

FIG. 1 shows the basic process flow. In the basic process, coal is burned in a combustion chamber 101 and the resulting flue gas 102 is passed thought a molten metal bath [103]. The elemental material, such as carbon, sulfur and the like, is captured 104, less dense secondary compounds are removed from the surface of bath 105, and denser secondary compounds are removed from the bottom of the bath 106. While this has been described as a method to remove oxygen-containing gases from a coal burning facility, use of this method to remove oxygen-containing gases from other processes, such as, for example, natural gas combustion process, coking processes, petrochemical processes and the like are also contemplated.

BRIEF DESCRIPTION OF THE DRAWINGS

For a more complete understanding of the present invention, reference is now made to the following descriptions taken in conjunction with the accompanying Figures and drawings, in which:

FIG. 3. shows a detailed cross sectional view of the reaction vessel wall.

DETAILED DESCRIPTION OF THE INVENTION

Figure 1:
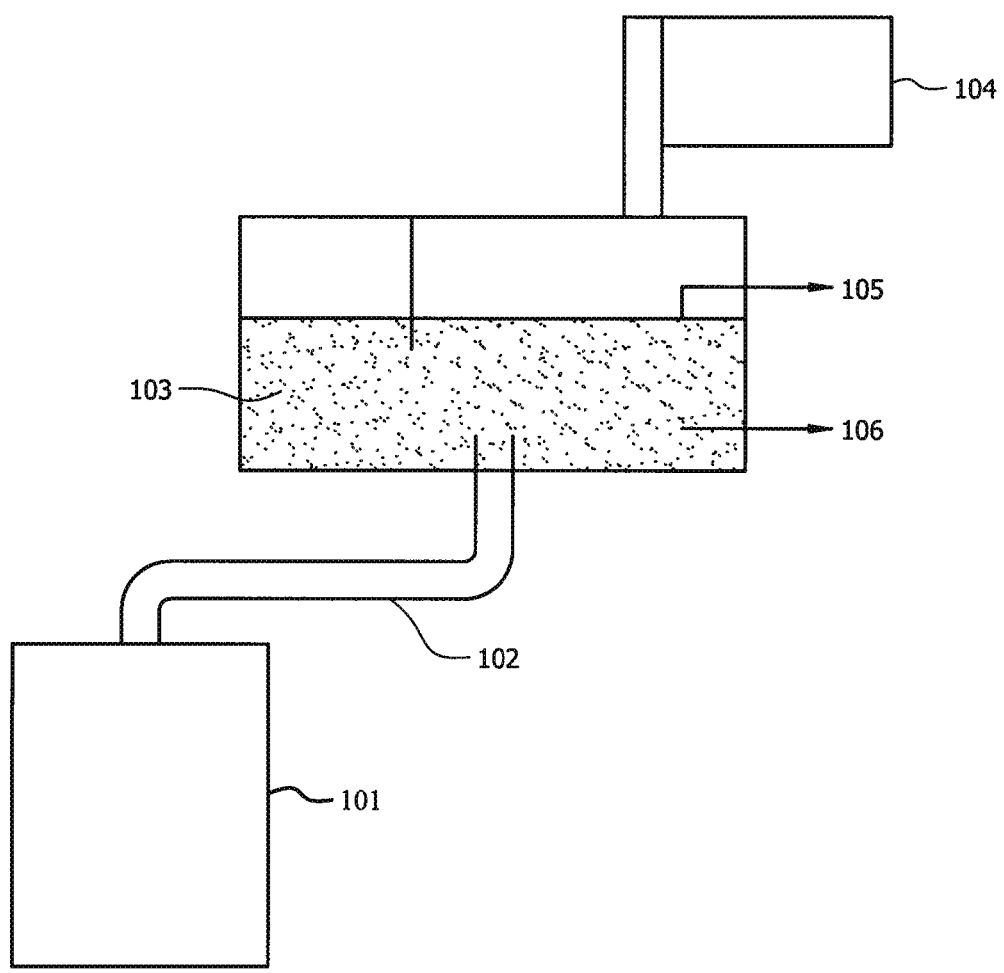
FIG. 1 shows the basic process flow.

The present invention provides a method and an apparatus for decomposing oxygen-containing greenhouse gases such as, but not limited to, carbon monoxide, carbon dioxide, nitrogen dioxide, sulfur dioxide, sulfur trioxide. The process utilizes a molten aluminum bath as the reactant. The gas stream containing the other reactants is passed through the aluminum bath to remove the oxygen-containing compounds. In the process, the aluminum strips the oxygen from those gases, producing alumina elemental carbon, sulfur and molecular nitrogen, which products are removed from the molten bath The alumina, carbon and sulfur can be sold and the nitrogen is either vented to the atmosphere or captured.

The process utilizes a molten metal as the primary reactant. In the preferred embodiments the molten metal is aluminum or an aluminum bath. The aluminum can also be alloyed with other elements including, but not limited to, zinc, iron, copper, silicon and calcium. Other metals and metal alloys such as calcium and silicon are also envisioned. The flue gas stream, which contains oxygen containing greenhouse gases produced by combustion processes, is passed through the aluminum alloy bath to remove the oxygen-containing gases from the flue gas stream. In the process, the molten aluminum splits the oxygen-containing greenhouse gases, creating alumina, and, in the case of flue gases containing carbon dioxide, $SO_x$, and $NO_x$ elemental carbon, elemental sulfur, and molecular nitrogen. These products are removed from the reaction vessel containing the molten aluminum bath. The alumina, carbon, and sulfur can be sold and the nitrogen is either vented to the atmosphere or captured.

In the process, excess heat is generated and can be used to facilitate other processes such as cogeneration of power. The excess generated by the process is a function of the makeup of the greenhouse gases in the flue gas feed. Generally, the amount of heat produced by the reaction increases as the percentage of oxygen containing compounds present in the flue gas stream increase.

When the flue gas stream contains other compounds, those compounds can also be split. For example, if the flue gas stream contains inorganic compounds, such as hydrochloric acid, the process will split the hydrochloric acid producing an aluminum salt, in this case aluminum chloride and hydrogen. The present invention also provides a method and apparatus for capturing heavy metals, such as, but not limited to mercury and cesium, which are often found in flue gas streams. In the process, the molten metal bath breaks down the metal compounds as they are introduced into the molten metal bath. As additional aluminum is added to the bath, the heavy metals settle to the bottom of the reaction vessels and are removed from the reaction vessel. While some aluminum may be entrained in the heavy metals that are removed from the bottom of the reaction vessel, the aluminum can be removed and refined and the heavy metals can be captured.

Figure 2:
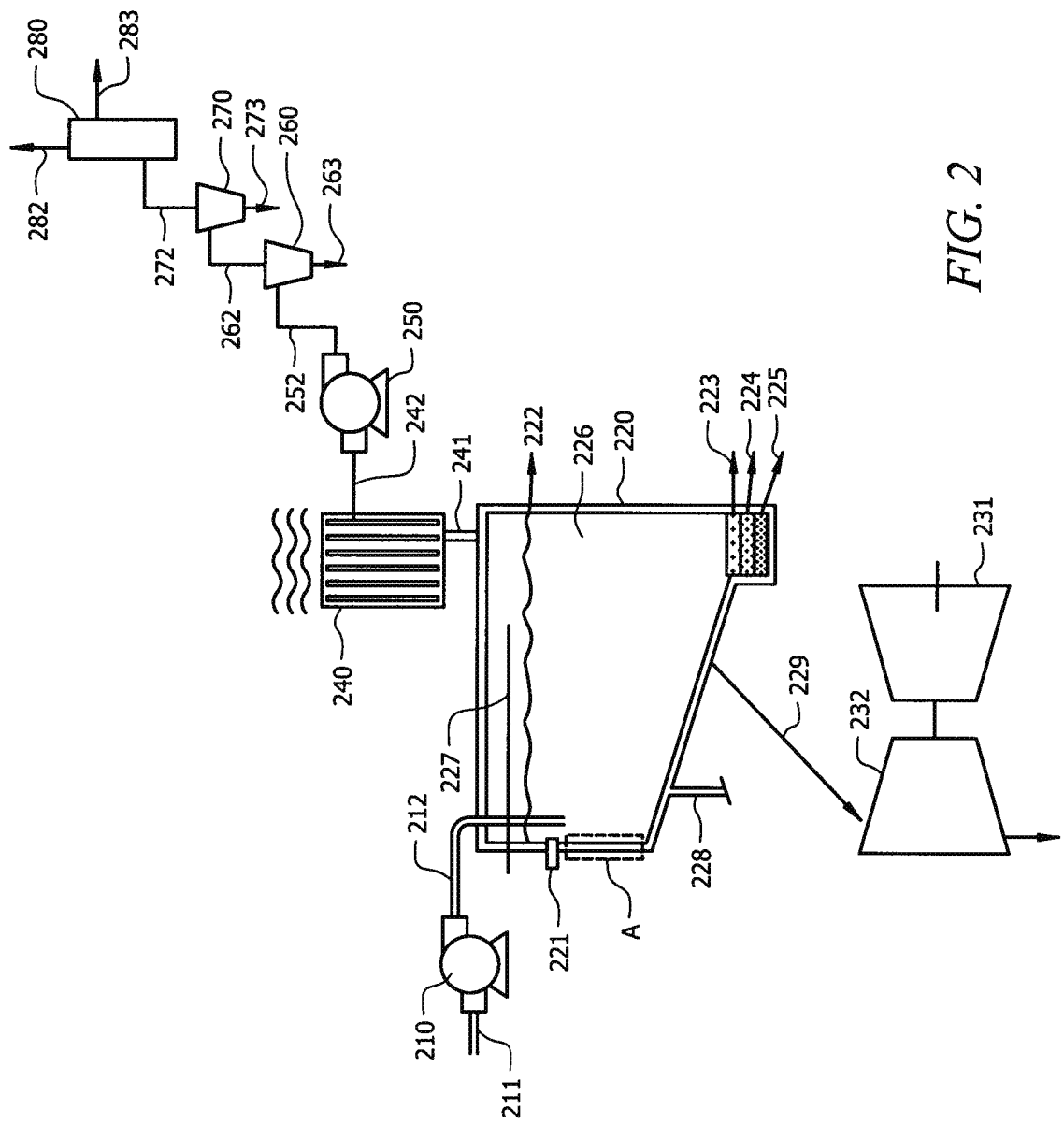
FIG. 2 shows a typical process flow.

A detailed process flow is shown in FIG. 2. While the process described discusses processing a flue gas stream from a coal combustion process, the flue gas from any combustion process steam can be processed using the invention. The flue gas is introduced into the treatment process through blower feed line 211. Blower 210 is used to inject the flue gas into reaction vessel 220 through injection line 212. Injection line 212 introduces the flue gas stream below the surface of the molten aluminum compound 226. Injection line 212 must be sufficiently below the surface of the molten aluminum compound 226 to all for sufficient mixing. The heavy products of the reaction, typically the heavy metals described above will settle out in the reaction vessel. The reaction vessel typically has a sloped bottom, however other designs such conical and the like can be utilized. Once the heavy products settle out, they are collected using collection lines 223, 224, and 225. Collection lines 223, 224, and 225 allow for heavy metals of different densities to be removed. Depending on the size of the process, the heavy products can be continuously removed or a batch removal process can be used.

Reaction vessel 220 also includes an aluminum feed line 221, which is used to supply additional aluminum compound to replace that consumed by the reaction with the greenhouse gases. While the reaction is exothermic, additional heat may be required during start-up, for example. Heater 227 is provided for this purpose. Heater 227 can be any type heater, including radiative, inductive, and convective. For example, heater 227 would be a microwave heater or a radio frequency heater wherein the frequency is tuned for the metal alloy used.

As discussed above, this process is exothermic. Thus, the heat generated by the reaction must be removed. Section A, which is shown in more detail in FIG. 3 shows one way the heat can be removed from the process. The reaction vessel 220 is lined with a refractory material 310, which protects the vessel wall 320. Cooling plate 330 is attached to the vessel wall 320 and cooling water is circulated in the channels created between the cooling plant 330 and the vessel wall 320. Insulation 340 surrounds the cooling plate to maximize heat recovery, as well as for safety purposes. Once the cooling water picks up the heat generated from the process, it can be either sent to a cooling tower or the heat can be recovered and used for other purposes. If the process is used in a facility that needs a hot water source, then the heat recovery system can be designed for this purpose. However, the heat can also be used to generate electricity.

Turning back to FIG. 2, a steam turbine electric generation process is represented. In this case, the cooling water is introduced thorough cooling feed 228. As the cooling water travels around the reaction vessel 220, it picks up heat and steam is generated. The steam generated is then sent via steam line 229 to steam turbine 232. The steam passes through the turbine and as it condenses, turns the turbine blades of turbine 232. Turbine 232 is coupled to generator 231. As the turbine turns the rotor of generator 231 though the stator, it generates electricity. While this process is only briefly described, this steam turbine-electric generator process is well known in the art. And any steam turbine-electric generator process could be utilized.

Also, as described above, the reaction will also produce elemental carbon, elemental sulfur, molecular nitrogen and molecular hydrogen. These will be removed from the reaction vessel using blower 250. Blower 250 will pull high temperature elemental carbon, elemental sulfur, molecular nitrogen and molecular hydrogen from the reaction vessel 220 through heat exchanger feed line 241 into heat exchanger 240. Heat exchanger 240 will then cool this material to enable further processing. Heat exchanger 240 can be any heat exchanger, however in the preferred embodiment, heat exchanger 240 is a forced air heat exchanger, however other heat exchangers, are also envisioned. The process steam then leaves the heat exchanger through line 242 and passes through blower 250 and blower discharge line 252 into two cyclone separators. The first separator 260 separates out carbon from process stream. The carbon is collected though separation line 263. The remaining process stream proceeds to the second separator 270, which separates out sulfur from the process stream. The sulfur is collected through separation line 273. The remaining process stream, which is mainly gaseous nitrogen and hydrogen, is then separated in cryo unit 280. In this unit, the gas stream is cooled further and separated into hydrogen and nitrogen.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of reducing greenhouse gases from a flue gas stream, the method comprising reacting the flue gas stream with a molten metal compound, wherein the molten metal compound is an aluminum alloy selected from the group consisting of silicon, magnesium, zinc, copper, iron, and calcium.

2. A method of reducing greenhouse gases from a flue gas stream, the method comprising reacting the flue gas stream with a molten metal compound, wherein the molten metal compound is silicon.

3. A method of reducing greenhouse gases from a flue gas stream, the method comprising reacting the flue gas stream with a molten metal compound, wherein the molten metal compound is a silicon alloy.

* * * * *